Patented Sept. 28, 1954

2,690,413

UNITED STATES PATENT OFFICE 2,690,413

METHOD OF FUMIGATION WITH ACETYLATED HALOGENATED THIOPHENE

Melvin J. Janes, Flower Hill, N. Y., and Duncan J. Crowley, Penns Grove, N. J., assignors to Socony-Vacuum Oil Company, Incorporated, a corporation of New York No Drawing. Application September 22, 1948, Serial No. 50,666

3 Claims. (Cl. 167—39)

This invention relates, broadly, to fumigants, and is more particularly concerned with a method of controlling pests, such as insects and nematodes, by exposing these pests to the vapors of certain thiophene compounds.

Fumigation is a method of pest control wherein the pests are exposed to the vapors of toxic materials. As is well known to those familiar with the art, fumigation, ordinarily, involves sealing a space where pests prevail and introducing a fumigant in amounts sufficient to produce lethal concentrations of vapors thereof within the space. At the end of the exposure time, the space is aired to remove the vapors of the fumigant. Soil fumigants are introduced into holes or furrows, manually or by machines, made in the soil which is then rolled to cause the fumigant to penetrate evenly. Subsequently, the soil becomes free of the fumigant by natural evaporation. Accordingly, a fumigant must be substantially volatile at ambient temperatures, it must afford toxic vapors, and it must be capable of being completely removed from the space wherein it is introduced by airing thereof in order that no residual amounts remain therein. Such a method of pest control is of especial value when pests must be destroyed in surroundings where residuals of poisonous materials are dangerous, for example, where foodstuffs, clothing, soil, etc., are involved.

It has now been found that pests can be controlled by a method which is effective and relatively inexpensive, and which, after treatment, leaves no residuals of poisonous materials. It has been discovered that pests can be controlled by exposure to vapors of halogenated thiophenes or of halogenated acetyl thiophene.

Accordingly, it is an object of the present invention to provide a method of controlling pests which is effective and relatively inexpensive. Another object is to provide a method of controlling pests which leaves no residuals and poisonous materials. A more specific object is to provide a method for controlling pests by exposure thereof to the vapors of halogenated thiophenes or of halogenated acetylthiophenes. Other objects and advantages of the present invention will become apparent to those skilled in the art from the following description.

Broadly stated, the present invention provides a method of controlling pests, which comprises exposing the pests to the vapors of halogenated thiophenes or of halogenated acetylthiophenes, in a confined space, at ambient temperatures, and maintaining said vapors in said space for a period of time and at a concentration sufficient to kill said pests.

The thiophene compounds which are utilizable in the method of the present invention are the halogenated thiophenes and the halogenated acetylthiophenes. Halogenated thiophenes are compounds in which one or more of the hydrogen atoms of the thiophene nucleus have been replaced by one or more halogen atoms. Particularly effective halogenated thiophenes are the mono- and poly-bromo- and chloro-thiophenes. Non-limiting examples of halogenated thiophenes are 2-chlorothiophene; 2,3-dichlorothiophene; 2,4 - dichlorothiophene; 3,4 - dichlorothiophene; 2,5-dichlorothiophene; 2,3,4-trichlorothiophene; 2,3,5-trichlorothiophene; tetrachlorothiophene; 2-bromothiophene; 2,5-dibromothiophene; 2,3-dibromothiophene; 2,4-dibromothiophene; 3,4-dibromothiophene; 2,3,4-tribromothiophene; 2,5- dibromothiophene; 2,3,5 - tribromothiophene; tetrabromothiophene; α- and β-tetrachlorothiolane; pentabromothiolane; hexachlorothiolane; hexabromothiolene; and octachlorothiolane.

The halogenated acetylthiophenes are derivatives of thiophene wherein a hydrogen atom of the nucleus has been replaced by an acetyl group

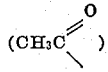

and one or more of the remaining hydrogen atoms have been replaced with halogen atoms. The chloro- and bromo-acetylthiophenes are especially preferred. Accordingly, 5-chloro-2-acetylthiophene; 2,5-dichloro-3-acetylthiophene; and 2,3,5-tribromo-4-acetylthiophene may be mentioned by way of non-limiting examples of the halogenated acetylthiophenes utilizable herein.

The time required to attain a lethal concentration of vapors of fumigant in the area to be fumigated is a variable, but nevertheless, extremely important factor. Exposure time will depend on a number of more or less related factors, such as temperature, volatility of the fumigant, dosage of the fumigant, and the effective lethal effect of the fumigant as compared to simple knockdown effect.

The temperature of exposure is usually the ambient temperature of the area to be fumigated. Obviously, this will vary over a relatively wide range depending on the locality and the season of the year. From a practical standpoint, ambient temperature usually is considered to vary between about 60° F. and about 90° F. It is to be strictly understood, however, that when the term "ambient temperature" is used herein and in the claims, reference is made to the prevailing temperature and that no narrow range of variation is intended.

Volatility of the fumigant is directly related to its boiling point and to the ambient temperature. In general, it has been found that progressive halogenation increases the boiling point of the thiophene derivative and, accordingly, decreases the ease with which the fumigant is substantially completely vaporized. Therefore, it will be appreciated that greater exposure time is required to obtain complete vaporization of the more highly halogenated fumigants.

The dosage of the fumigant and its effective lethal action are directly interrelated. Dosage is expressed in units of fumigant per volume of space to be fumigated, and suitably, it is expressed in pounds of fumigant per thousand cubic feet of space. As those familiar with the art will appreciate, the dosage will vary with the lethal power of each fumigant, for example, larger dosages of the less powerful fumigants will be required to achieve a certain desired result. The minimum dosage will be dependent on the fumigant used, but, obviously, there can be no real maximum dosage, the latter being determined primarily by economical considerations. Dosage can be so large that an effective lethal concentration of fumigant vapors is obtained before all of the fumigant has been vaporized. Therefore, it will be appreciated that the effective time for which an area must be exposed to the action of a fumigant will be the time necessary to vaporize a sufficient amount of fumigant; knowing its vapor pressure and the ambient temperature, to produce a lethal concentration of vapors. For example, a space must be exposed to a dosage of about 0.3 pound of 2-chlorothiophene per thousand cubic feet of space, for about 24 hours, at about 80° F., in order to effect complete lethal action. Yet, at the same temperature, only about three hours are required when the dosage is about 11.6 pounds of 2-chlorothiophene per thousand cubic feet of space. On the other hand, in the case of 2,5-dibromothiophene, a dosage as low as 0.18 pound per cubic foot of space will be effective in about 24 hours, at about 68° F., i. e., at ambient atmospheric conditions. Accordingly, it will be appreciated that there is no clearly definable relationship among the factors mentioned and discussed hereinbefore. However, the foregoing discussion will enable those skilled in the art to determine readily the particular combination of factors to be used with any given fumigant, when one or more of the other factors is known.

In accordance with the present invention, the desired dosage of halogenated thiophene or of halogenated acetylthiophene is introduced into the space to be fumigated in any convenient manner. The space is then sealed and kept in that state for a time sufficient to attain a lethal concentration of fumigant vapors, depending on the ambient temperature, and the volatility of the fumigant employed. After the required time has elapsed, the space is opened and aired, whereupon the vapors of the fumigant and any unvaporized fumigant are completely removed. As a result of this procedure, all the pests in the space are killed and the space remains uncontaminated by poisonous materials.

Although the method of the present invention is effective in controlling all pests subject to destruction by fumigation, it is particularly effective for household and stored products insects as represented by the confused flour beetles, granary weevils, rice weevils, carpet beetles, and roaches.

The following specific examples illustrate the particular effectiveness of the method of the present invention. It is to be clearly understood, however, that the invention is not to be limited to the particular halogenated thiophenes or halogenated acetylthiophenes set forth in the examples, or to the operations and manipulations described therein. As will be apparent to those skilled in the art, a wide variety of other halogenated thiophenes or halogenated acetylthiophenes, as set forth hereinbefore, may be used in the present method.

EXAMPLE I

In general, testing was carried out in a glass battery jar of 3,375-milliliter capacity. A counted number of confused flour beetles (*Tribolium confusum* Duval) were placed in a pound glass jar having a wire screen top. The beetle-containing jar was placed on a tripod within the battery jar and 2-chlorothiophene was placed on the bottom of the battery jar, taking care that no liquid came in contact with the beetles. The battery jar was then covered with a tightly-fitted glass closure, sealed with petroleum jelly. The equipment was left in this position for a predetermined period of time at ambient temperatures varying between about 80° F. and about 84° F. and then opened to the air. The beetles were observed immediately after the exposure period, and again after a 24-hour recovery period.

The pertinent data obtained by operating at various dosages and periods of exposure time are set forth in Table I.

*Table I.—Toxicity of 2-chlorothiophene to the confused flour beetle*

| Number of Beetles | Dosage, lbs./1,000 ft.³ | Exposure Time | | Appearance of Beetles | | | | Appearance of Recovered Beetles |
|---|---|---|---|---|---|---|---|---|
| | | Hours | Minutes | After Exposure | | After 24-hour recovery | | |
| | | | | Alive | Dead | Alive | Dead | |
| 32 | 11.6 | 3 | 35 | 0 | 32 | 0 | 32 | |
| 31 | 9.2 | 3 | 44 | 0 | 31 | 0 | 31 | |
| 25 | 7.0 | 3 | 13 | 0 | 25 | 0 | 25 | |
| 31 | 4.6 | 5 | -------- | 0 | 31 | 0 | 31 | |
| 40 | 4.6 | 5 | 22 | 0 | 40 | 0 | 40 | |
| 37 | 2.2 | 8 | -------- | 0 | 37 | 0 | 37 | |
| 39 | 2.2 | 21 | 30 | 0 | 39 | 0 | 39 | |
| 26 | 1.1 | 21 | 30 | 0 | 26 | 0 | 26 | |
| 47 PG* | 1.0 | 24 | -------- | 0 | 47 | 0 | 47 | |
| 28 | 0.92 | 24 | -------- | 0 | 28 | 0 | 28 | |
| 36 | 0.55 | 24 | -------- | 0 | 36 | 0 | 36 | |
| 22 | 0.37 | 24 | -------- | 0 | 22 | 0 | 22 | |
| 47 PG* | 0.33 | 24 | -------- | 16 | 31 | 0 | 47 | |
| 36 | 0.28 | 24 | -------- | 4 | 32 | 1 | 35 | Dead after 48 hours. |
| 30 | 0.18 | 24 | -------- | 3 | 27 | 1 | 29 | Do. |
| 33 | 0.18 | 24 | -------- | 3 | 30 | 0 | 33 | |

*Some of the tests set forth in Table I were made in the conventional Peet-Grady chamber, for the purpose of comparing the effectiveness of the test method employed. These tests are denoted by the initials "PG" in the table. It will be apparent that the results compare favorably with results obtained in the battery jar apparatus.

EXAMPLES II TO IX

Tests were run in a similar manner as that set forth in Example I. Halogenated acetylthiophenes and other halogenated thiophenes and black carpet beetle larvae (*Attagenus piceus*), as well as confused flour beetles were used. The pertinent data are set forth in Table II.

*Table II.—Toxicity of various halogenated thiophenes and of various halogenated acetylthiophenes to the confused flour beetle and to the black carpet beetle larvae*

1. CONFUSED FLOUR BEETLE

| Halogenated Thiophene | Number of Beetles | Dosage, lbs./1,000 ft.³ | Exposure Time | | Appearance of Beetles | | | | Appearance of Recovered Beetles |
|---|---|---|---|---|---|---|---|---|---|
| | | | | | After exposure | | After 24-hr. Recovery | | |
| | | | Hours | Minutes | Alive | Dead | Alive | Dead | |
| 2,5-dichlorothiophene | 26 | 0.18 | 24 | -------- | 21 | 5 | 13 | 13 | 19 dead after 48 hrs. |
| 2,3,4-trichlorothiophene | 33 | 0.18 | 24 | -------- | 30 | 3 | 18 | 15 | No change after 48 hrs. |
| 2,3,5-trichlorothiophene | 28 | 0.92 | 24 | -------- | 0 | 28 | 0 | 28 | |
| | 28 | 0.55 | 24 | -------- | 0 | 28 | 0 | 28 | |
| | 28 | 0.37 | 24 | -------- | 5 | 23 | 1 | 27 | Very inactive. |
| tetrachlorothiophene | 28 | 6.1 | 21 | 30 | 0 | 28 | 0 | 28 | |
| | 26 | 3.1 | 21 | 30 | 0 | 26 | 0 | 26 | |
| | 29 | 1.5 | 22 | 30 | 0 | 29 | 0 | 29 | |
| | 32 | 0.92 | 24 | -------- | 13 | 19 | 4 | 28 | Do. |
| | 40 | 0.55 | 24 | -------- | 12 | 28 | 2 | 38 | Do. |
| | 34 | 0.37 | 24 | -------- | 21 | 13 | 7 | 27 | Do. |
| 2-bromothiophene | 24 | 0.92 | 24 | -------- | 0 | 24 | 0 | 24 | |
| | 29 | 0.55 | 24 | -------- | 0 | 20 | 0 | 29 | |
| | 31 | 0.37 | 24 | -------- | 0 | 31 | 0 | 31 | |
| | 30 | 0.18 | 24 | -------- | 3 | 27 | 0 | 30 | |
| 2,5-dibromothiophene | 27 | 0.92 | 24 | -------- | 0 | 27 | 0 | 27 | |
| | 32 | 0.55 | 24 | -------- | 0 | 32 | 0 | 32 | |
| | 29 | 0.37 | 24 | -------- | 0 | 29 | 0 | 29 | |
| | 29 | 0.18 | 24 | -------- | 0 | 29 | 0 | 29 | |

2. BLACK CARPET BEETLE LARVAE

| Halogenated Acetyl Thiophene | Number of Beetle Larvae | Dosage, lbs./1,000 ft.³ | Exposure Time, Days | Appearance of Beetle Larvae | | | |
|---|---|---|---|---|---|---|---|
| | | | | After Exposure | | After 24-hr. Recovery | |
| | | | | Alive | Dead | Alive | Dead |
| 5-chloro-2-acetylthiophene | 10 | 2 | 7 | 4 | 6 | 4 | 6 |
| 2,5-dichloro-3-acetylthiophene | 10 | 2 | 7 | 0 | 10 | 0 | 10 |

EXAMPLE X

Tests similar to those described in Example I were made on the confused flour beetle, using 5-chloro-2-acetylthiophene as the fumigant. The pertinent data are set forth in Table III.

*Table III.—Toxicity of 5-chloro-2-acetylthiophene to the confused flour beetle*

| Number of Beetles | Dosage, lbs./1,000 ft.$^3$ | Exposure Time, Hours | Vaporization, Percent | Effective Dosage | Appearance of Beetles | | | |
|---|---|---|---|---|---|---|---|---|
| | | | | | After Exposure | | After 24-hr. Recovery | |
| | | | | | Alive | Dead | Alive | Dead |
| 25 | 1.84 | 24 | 31 | 0.57 | | | 0 | 25 |
| 25 | 0.92 | 24 | 45 | 0.42 | | | 3 | 22 |
| 24 | 0.55 | 24 | 60 | 0.33 | | | 12 | 12 |
| 27 | 0.18 | 24 | 80 | 0.14 | | | 19 | 8 |

EXAMPLE XI

A series of tests was made employing 2-chlorothiophene and the house fly (*Musca domestica*) using the same procedure as set forth in Example I. The pertinent data are tabulated in Table IV.

*Table IV.—Toxicity of 2-chlorothiophene to the house fly*

| Number Files | Dosage, lbs./1,000 ft.$^3$ | Exposure Time | | | | Activity During Recovery | Appearance After 24-Hr. Recovery Period | |
|---|---|---|---|---|---|---|---|---|
| | | To Stop Movement | | Total Exposure | | | | |
| | | Hours | Minutes | Hours | Minutes | | Alive | Dead |
| 13 | 11.6 | | 52 | | 52 | None | 0 | 13 |
| 13 | 11.6 | 1 | 5 | 1 | 5 | do | 0 | 13 |
| 11 | 9.2 | | 52 | | 52 | do | 0 | 11 |
| 9 | 9.2 | 1 | 2 | 1 | 2 | do | 0 | 9 |
| 12 | 7.0 | 1 | | 1 | | do | 0 | 12 |
| 14 | 4.6 | 1 | 20 | 1 | 20 | do | 0 | 14 |
| 11 | 4.6 | 1 | 20 | 1 | 20 | do | 0 | 11 |
| 11 | 2.2 | 1 | 21 | 1 | 21 | do | 0 | 11 |
| 11 | 1.7 | 1 | 48 | 1 | 48 | do | 0 | 11 |
| 10 | 1.1 | 1 | 54 | 1 | 54 | do | 0 | 10 |
| 12 | 0.7 | Movement After— 4 | 20 | 4 | 20 | Slight Movement | 0 | 12 |

EXAMPLE XII

A series of tests was made employing 2-chlorothiophene and the German roach (*Blatella germanica*) using the same procedure as set forth in Example I. The pertinent data are tabulated in Table V.

*Table V.—Toxicity of 2-chlorothiophene to the German roach*

| Number of Roaches 4th Instar Nymphs | Dosage, Lbs./1,000 ft.$^3$ | Exposure Time, Hours | Appearance of Roaches | | | |
|---|---|---|---|---|---|---|
| | | | After Exposure | | After 24-Hour Recovery | |
| | | | Alive | Dead | Alive | Dead |
| 12 PG* | 1.00 | 24 | 6 | 6 | 0 | 12 |
| 8 PG* | .33 | 24 | 6 3 | 5 | 0 | 8 |

*Tests conducted in Peet-Grady chamber.

EXAMPLE XIII

For the purpose of determining whether the insects used in the tests had sufficient air to survive during the test period, a series of tests was made in the same apparatus as used in Example I. The insects were confined in the sealed apparatus at 80–84° F. for 24 hours in the absence of any toxic material. From the data set forth in Table VI, it will be apparent that the insects had a sufficient amount of air for survival during the exposure period, i. e., the lethal results obtained in the other tests where fumigants were employed, were due entirely to the fumigant and not to lack of air.

*Table VI.—Survival of insects in test chamber in absence of fumigants*

| Insect | Number | Exposure Time, Hours | Appearance After 24-Hr. Recovery Period | | Appearance of Recovered Insects |
|---|---|---|---|---|---|
| | | | Alive | Dead | |
| Confused flour beetle. | 30 | 24 | 30 | 0 | Normal. |
| Do | 24 | 24 | 22 | 2 | Do. |
| Do | 20 | 24 | 17 | 3 | Do. |
| Do | 38 | 24 | 37 | 1 | Do. |
| Do | 41 | 24 | 40 | 1 | Do. |
| House Fly | 10 | 4⅓ | 10 | 0 | Do. |
| Do | 12 | 4⅓ | 12 | 0 | Do. |
| Do | 11 | 4⅓ | 11 | 0 | Do. |
| German Roach | 5 | 24 | 5 | 0 | Do. |

From the data set forth in the tables, it will be apparent that the method of the present invention is effective for controlling all pests subject to destruction by fumigation. It is to be noted that the fumigants of the present invention are not equivalent in effectiveness and that dosage, exposure time, etc., may be varied over a wide range, as has been set forth in detail hereinbefore. It will be noted, also, that the most effective, and hence, the preferred fumigants utilizable in the present invention are 2-chlorothiophene; 2,5-dibromothiophene; and 5-chloro-2-acetylthiophene.

Although the present invention has been described in conjunction with preferred embodiments, it is to be understood that modifications and variations may be resorted to, without departing from the spirit and scope of this invention, as those skilled in the art will readily undertsand. Such variations and modifications are considered to be within the purview and scope of the appended claims.

What is claimed is:

1. A method of killing insects and nematodes subject to destruction by fumigation, which comprises exposing the insects and nematodes to the vapors of 2,5-dichloro-3-acetylthiophene, in a confined space, at ambient temperatures, and maintaining said vapors in said space for a period of time and at a concentration, sufficient to kill said insects and nematodes.

2. A method of killing insects and nematodes subject to destruction by fumigation, which comprises exposing the insects and nematodes to the vapors of an acetylated halogenated thiophene, otherwise unsubstituted, in a confined space, at ambient temperatures, and maintaining said vapors in said space for a period of time and at a concentration sufficient to kill said insects and nematodes.

3. A method of killing insects and nematodes subject to destruction by fumigation, which comprises exposing the insects and nematodes to the vapors of a thiophene compound selected from the group consisting of 5-chloro-2-acetylthiophene, 2,5-dichloro-3-acetylthiophene, and 2,3,5-tribromo-4-acetylthiophene, in a confined space, at ambient temperatures, and maintaining said vapors in said space for a period of time and at a concentration sufficient to kill said insects and nematodes.

References Cited in the file of this patent

UNITED STATES PATENTS

| Number | Name | Date |
|--------|------|------|
| 1,934,803 | Kharash | Nov. 14, 1933 |
| 2,010,841 | Bender | Aug. 13, 1935 |
| 2,362,472 | Dreisbach | Nov. 14, 1944 |
| 2,651,579 | Plump | Sept. 8, 1953 |

FOREIGN PATENTS

| Number | Country | Date |
|--------|---------|------|
| 812,749 | France | May 15, 1937 |
| 2,533 | Australia | June 28, 1926 |

OTHER REFERENCES

Steinkopf: "Die Chemi des Thiophens," Dresden and Leipzig, 1941, pages 50–58.

Alles, in J. Pharm. & Exp. Ther., vol. 72 (1941), page 265.

U. S. Dispensatory, 22nd ed., 1937, pages 1615, 1616.

Richter: "Organic Chemistry," vol. III, 1923, pages 21–24.

Powers: "Advancing Fronts in Chemistry," vol 11, Reinhold Publ. Co., N. Y., 1946, page 33.

Caesar and Sachanen: "Theophene Formaldehyde Condensation," Ind. Eng. Chem., vol. 40, No. 5, May 1948, page 922.

"Destructive and Useful Insects, Their Habits and Control" by Metcalf et al., 2nd ed., McGraw-Hill, 1939, page 276.